D. Y. STRAUSS.
MANUFACTURE OF FOOD FROM BEAN VINES.
APPLICATION FILED MAR. 24, 1914.

1,141,079.

Patented May 25, 1915.

Witnesses

Inventor
Dennis Y. Strauss
his Attorney

UNITED STATES PATENT OFFICE.

DENNIS Y. STRAUSS, OF ARTESIA, CALIFORNIA, ASSIGNOR TO CALIFORNIA RETARDER & FIBRE COMPANY, OF LOS ANGELES, CALIFORNIA, A CORPORATION OF CALIFORNIA.

MANUFACTURE OF FOOD FROM BEAN-VINES.

1,141,079.     Specification of Letters Patent.     Patented May 25, 1915.

Original application filed November 11, 1913, Serial No. 800,269. Divided and this application filed March 24, 1914. Serial No. 826,975.

*To all whom it may concern:*

Be it known that I, DENNIS Y. STRAUSS, a citizen of the United States, residing at Artesia, in the county of Los Angeles, State of California, have invented new and useful Improvements in the Manufacture of Food from Bean-Vines, of which the following is a specification.

This invention relates to the manufacture of food from bean vines; and this application is in the nature of a division from my application S. N. 800,269 filed November 11th, 1913. In this application, I wish to generally set forth my process for treating bean vines (*Phaseolus*); and then to particularly describe and claim that portion of my complete process which relates particularly to the extraction and preparation of food values from bean vines. It will be understood that in the practical working of my process I may simultaneously extract and prepare from said vines a number of products among which are bean vine fiber, animal food and plaster retarder. Such simultaneous production of different products is an efficient means of extracting and utilizing all the valuable constituents of said vines; but it will be understood that each divisional process may be separately practised.

After a general description of my whole method and a particular description of the divisional process for extraction of food products, I shall herein explain the peculiar qualities and excellencies of said food products.

Figure 1:
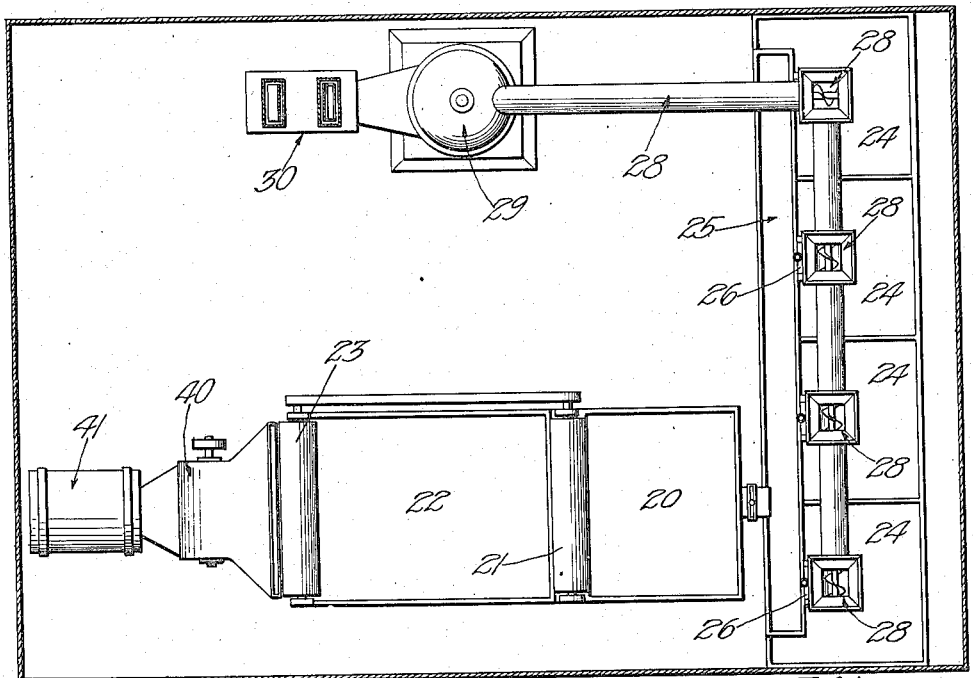
Figure 2:
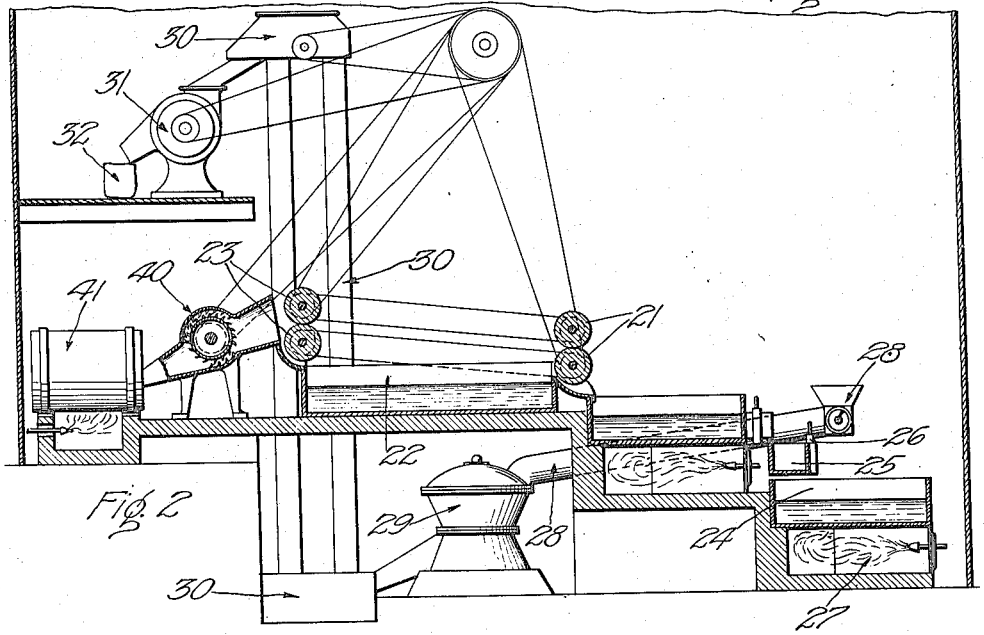

I have illustrated preferred forms of apparatus for my process in the accompanying drawings, in which, Figure 1 is a plan view of a plant capable of carrying out my process, Fig. 2 is an elevation thereof.

The bean vines (*Phaseolus*), are commonly brought from the field in dried condition. Beans are threshed from the vines after the vines and beans have been dried in the field; so that the vines thrown off by the thresher are necessarily fairly dry. These dried vines are produced and destroyed in enormous quantity each year; and it is the prime object of my invention to extract valuable products therefrom and to thereby prevent the annual waste of a great amount of useful material. The first operation of my process is to boil the vines in a boiling vat 20 in clear water or in any other suitable liquid. A certain amount of liquid contents of the vines is extracted by the boiling; but the main object of boiling is to loosen the fiber and structure of the vines. I next pass the vines between suitable crushers or crushing rolls 21, whence they are passed through a vat 22 containing clear water. From the rinsing vat the vines are then passed through another set of crushing rolls 23 where a high percentage of the remaining liquid content of the vine is removed. The liquids removed by crushing run back through the vat 22, overflowing into the boiling vat 20; and from the boiling vat the liquids are taken through any suitable distributing system into evaporation vats 24. The distributing system from the boiling vat 20 may involve a sluice-way 25, or any other suitable means, having outlets 26 into the various evaporating vats 24 so that the evaporating vats may be charged at will. Heat is supplied to the evaporating vats in any desired manner, as by a furnace 27 underneath each vat. When the liquid in any vat has been partially evaporated, the remaining thick liquid is absorbed by a suitable absorbent, the nature of the absorbent depending upon the use to which the final product is put. The absorbent is allowed to remain until the free moisture is reduced to about three per cent., the remainder being taken up by crystallization. The caked solid is removed from the vat into suitable conveyers 28 where it is carried to a crusher 29, preferably of the rotary type. From this crusher the product is elevated by elevator 30 and is discharged into a pulverizer 31, when it is ready to be sacked for shipment as illustrated by 32.

The moist fiber emerging from the last set of crushing rolls 23 passes to a rotary shredder 40 or the like, and thence into a drier 41 of any preferred construction. I may use any of the forms of shredder or drier now obtainable on the market. I may use a pulping machine instead of a shredder, putting out the final product in pulp form for manufacture of various kinds. The resultant fiber or pulp product emerging from the drier may be sacked or baled for commercial use.

The foregoing sets forth my general process for utilization of bean vines; in which process I extract and use all of the constituents of the vine.

In the specific process for manufacture of food products, I extract the liquid and soluble content of the vines as above explained. The boiling has the effect of loosening the structure of the vine and dissolving the soluble nutritious organic constituents; the crushing operation frees the vines of most of the original moisture and of the liquid absorbed in the boiling vat together with the matter dissolved therein. All this extracted liquid is brought together in the boiling vat, whence it is withdrawn to the battery of evaporation vats. Partial or complete evaporation of the water in the liquid takes place in the evaporation vats, the extent of said evaporation depending upon the quality of food product desired. Thus, when it is desired to use the extract without absorption in a carrier, the evaporation may be carried further than when an absorbent is used. The pure extract may be used as food after complete evaporation of the water to dryness or after evaporation to a thick liquid. With less evaporation, a suitable absorbent carrier, such as bran or other suitable food absorbent, may be put into the vats in such quantity that practically all the liquid is taken up; all but about three per cent., which is taken up by crystallization. The cake thus formed is removed, crushed and pulverized as explained, being then ready for market and use.

The liquid content of the bean vines is very nutritious. It has been common practice to feed the whole vines in small quantities to stock; but the presence of the large amount of strong fiber has limited its use as food to a small proportion of the total food required by animals. By my process the fiber is removed and used, and the nutritious constituents are extracted and prepared in such form that stock derive the full benefit. I have said that the extract may be fed pure or with an absorbent. In its pure form, and pressed into small cakes with addition of condiments, flavors or other suitable material, it becomes excellent base for soup, broth, consommé, etc.

To a certain extent the quality of the bean itself is present in the liquid and soluble portions of the vine; and my process removes the obstacle (the fiber) preventing the use of these very nutritious constituents. It will be understood that the foremost excellency of my process and food product lies in the fact that it utilizes a farm product heretofore considered waste. Annually enormous quantities of bean vines are burned or otherwise destroyed; my process turns this enormous annual waste and loss into a corresponding saving and gain. My process may use any of the bean vines, such as are generally known as Lima beans, navy beans, field beans, string beans, and all others, belonging chiefly to the genus *Phaseolus*.

I claim—

1. The herein described process for obtaining food from bean vines consisting in extracting a portion of the nutritious organic constituents thereof by boiling in water, further extracting an additional portion of said constituents by crushing and finally evaporating the boiling liquid and the last named extracted portion together.

2. A process for making food from bean vines consisting in first boiling the vines in water, second crushing the vines allowing the liquid contained therein to run back into a water, third rinsing the boiled vines in said water and fourth evaporating the rinsing water and the boiled water together.

3. The herein described process for preparation of food from bean vines comprising first boiling the vines in water to loosen the vine structure and to dissolve and remove a portion of the nutritious organic constituents thereof, second passing said boiled vines through crushing rollers, said rollers further extracting the remaining liquid organic constituents left in the vine, and then adding the boiling liquid and said extracted liquid together and evaporating the same.

4. The herein described process for obtaining food from vines, which consists in extracting a portion of the nutritious organic constituents thereof from said vines by boiling the same in water, then extracting an additional portion of said constituents by crushing the vines then rinsing said vines in water and then adding the boiling liquid, to the said extracted liquid and the rinsing water together and evaporating the same.

5. The herein described process for obtaining food from vines, which consists in extracting a portion of the nutritious organic constituents thereof from said vines by boiling the same in water, then removing an added portion of said constituents, by crushing the vines to extract a liquid therefrom, then adding the boiling liquid to the extracted liquid and evaporating the same, and then adding a base of absorbent edible material.

6. A food of the character described comprising a base of absorbent edible material, which is impregnated with the nutritious water extracted constituents of bean vines.

In witness that I claim the foregoing I have hereunto subscribed by name this 13th day of March 1914.

DENNIS Y. STRAUSS.

Witnesses:
TIMOTHY MAHONEY,
H. B. MILLS.